May 3, 1932. H. M. HOOD 1,857,085
METHOD OF MOLDING SPONGE RUBBER ARTICLES
Original Filed Aug. 17, 1928
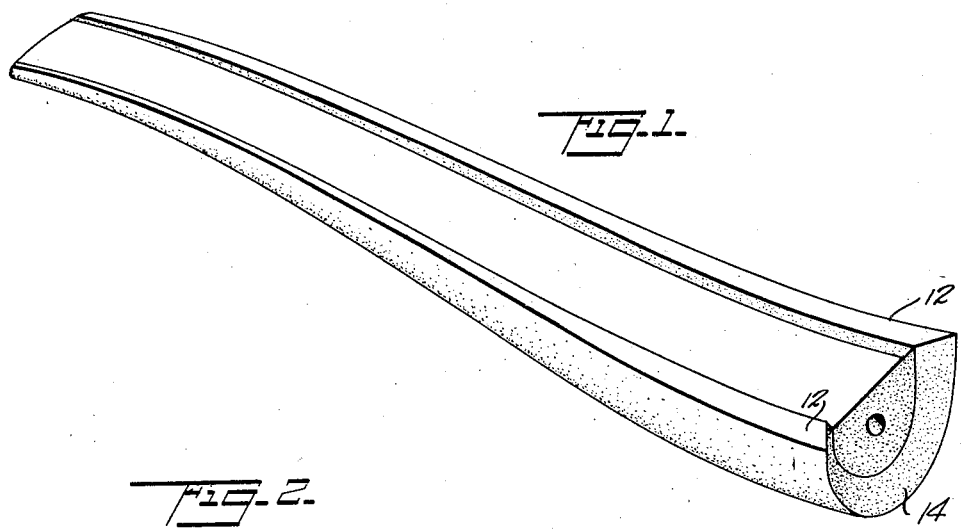
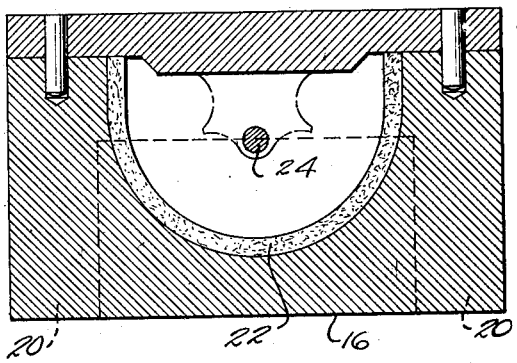
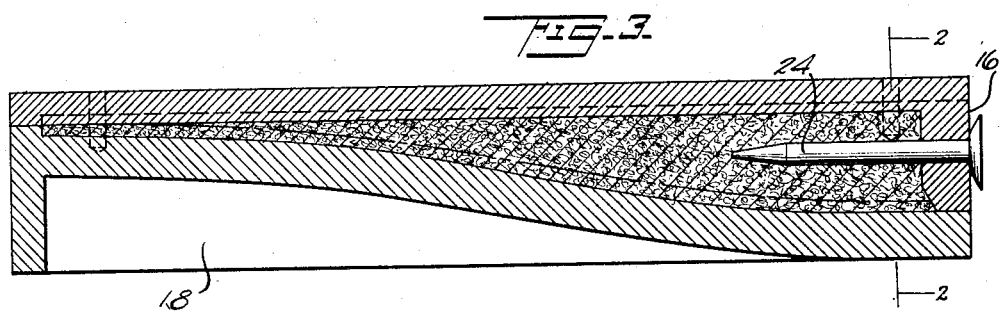
INVENTOR
Harry M. Hood
BY
ATTORNEY Patented May 3, 1932

1,857,085

UNITED STATES PATENT OFFICE

HARRY M. HOOD, OF CHICAGO, ILLINOIS, ASSIGNOR TO FEATHEREDGE RUBBER COMPANY, INC., A CORPORATION OF ILLINOIS

METHOD OF MOLDING SPONGE RUBBER ARTICLES

Application filed August 17, 1928, Serial No. 300,182. Renewed September 4, 1931.

In the manufacture of sponge rubber articles, a compound is prepared containing a blowing agent which is sheeted and then placed in the bottom of the mold, after which the mold is closed, and when heated the rubber swells and fills the mold. In sheeting the rubber, it has heretofore been considered necessary to use a sheet of compound of sufficient thickness so that when the heat is applied the rubber will expand upward to the top of the mold. Further, it is quite important that the amount of heat introduced into the rubber during the vulcanization be proportionate to the thickness of the article to be produced, so that an even cure can be had. Because of these two factors, sponge rubber articles have heretofore been quite limited as regards their shape, being restricted to articles approximately in the form of sheets or relatively long members of substantially uniform cross section. The present invention relates to a method whereby sponge rubber articles of greatly varied contour can be produced.

For the purposes of illustration, I will describe my invention in connection with an arm rest for use in automobiles or chairs and in connection therewith refer to the accompanying drawings in which Fig. 1 is a perspective view of the finished article which I aim to produce; Fig. 2 is a sectional view through the mold showing the rubber compound as it is put in place, with the position of the rubber in the course of the vulcanization shown in broken lines, and Fig. 3 is a longitudinal section through the mold.

The particular arm rest here selected for the purposes of illustration is approximately semi-circular in cross section at one end and gradually tapers down to a thin flat section at the other end. The flat side has two edge portions 12 which form a recess between them and the large end has a semi-circular flange 14.

According to previous practice, one attempting to make such an article would provide a mold with the semi-circular cavity in the bottom half and the top plate shaped to form the recess between the side flanges 12. It would then be necessary to form a tapering mass of sponge rubber to take care of the varying thickness of the article. Even if this were tried, the result would not be successful, for my experience has shown that the varying thickness of rubber would not expand evenly so that the flanges 12 would be very imperfectly formed and the thin end would be very much overcured if the thick end was properly vulcanized.

To accomplish the desired result, I utilize two expedients:

The mold is made as usual with the semi-circular cavity in the bottom portion 16 but instead of this cavity being cut in a solid block of metal, I cut away the metal progressively toward the thin end of the desired article to form a cavity 18 on the under side, and leaving the two side flanges 20 to give the mold a uniform thickness. The amount of metal to be cut away can quickly be determined for any given article. I find that by this arrangement the heat is transmitted to the thin end much more slowly, as it must pass from the press plates to the cavity surface by conduction through the side flanges instead of through the entire mass of the mold, and by adjusting the amount of metal which contacts with the press plates the rapidity of flow of heat to the compound can be so regulated that an even cure will be had throughout.

As regards the arrangement of rubber compound, I have found that one can use a relatively thin sheet but can adjust the amount of rubber by varying the area of the sheet and bending it around to follow the sides of the mold so that at different cross sections of the mold there is an approximate proportion between the amount of mold surface covered and the respective areas of the cross sections. Thus with a semi-circular structure or one more or less approximating the semi-circular, the sheet can be cut to be approximately a development of the inner wall of the mold cavity.

As shown in Fig. 2, the sheet of compound 22 is positioned in the mold with its edges following the entire cavity surface and coming up to form the flanges at the sides. As the mold is heated, the rubber will flow upward and toward the center as shown in broken lines in Fig. 2, and the portions meeting in the center will unite and coalesce so that ordinarily there is no sign of cleavage discernible. It will be noted that by this arrangement the heat is transmitted quite evenly to all of the compound so that it blows quite uniformly, whereas, if the compound were thick in some places and thin in others, there would be a tendency for the thick portion to heat more slowly than the thin portion and the blowing would be quite uneven.

If the article is quite thick, even with the precautions noted it will sometimes be found that the outside of the rubber mass is overcured before the center is properly vulcanized, for the spongy mass is a very poor conductor of heat. Under such circumstances the evenness of the transmission of heat can be further aided by providing a metal member which will contact with the mold and extend into the rubber mass and serve as a heat conductor. Thus in the illustrative example given, I may provide a pin 24 which is removably positioned in an appropriate hole in the end of mold 16 and extends into the largest part of the cavity. When the rubber has blown, it will surround this pin which will conduct heat to the center of the mass. After the cure is finished, the pin here shown may be removed before the finished article is taken from the mold.

It is to be understood that this process is applicable to many different forms of article and the arm rest here illustrated is given only by way of example.

What I claim is:

1. In the art of molding sponge rubber articles of non-uniform cross section, the step of covering substantially more than one-half of the mold surface with a sheet of sponge rubber compound but leaving a portion of the mold surface uncovered, and proportioning the amount of surface covered at any cross-section of the mold to the area of such cross-section.

2. In conjunction with the step specified in claim 1, the further step of curing the article by heating the mold in such a way that heat is transmitted more rapidly to those portions of the mold having a cavity of large cross sectional area than to those having a small cross sectional area.

3. A mold for sponge rubber articles of uneven contour comprising a block of metal in which a mold cavity is formed, said block being solid adjacent a portion of the mold having a relatively thick cross-sectional area and a cored out cavity in the block adjacent a portion of the mold having a relatively thin cross-sectional area, whereby the conduction of heat to such portion of the mold will be restricted.

4. The method of molding sponge rubber articles of considerable thickness which comprises the steps of providing a metal heat conductor adapted to contact with a mold wall and extend into the mold cavity and covering substantially more than one-half of the mold surface with a sheet of sponge rubber compound and then subjecting the mold to heat so that such compound may be heated quite rapidly to cause even blowing, and after blowing may be heated internally and externally to cause even curing.

5. A mold for thick sponge rubber articles, comprising a block of material in which a mold cavity is formed and a heat conducting pin attached to said block extending into the mold cavity and adapted to equalize the temperature of the block and the cavity.

HARRY M. HOOD.